April 6, 1943.    W. J. SNYDER    2,315,877
MACHINE TOOL
Filed June 9, 1941    2 Sheets-Sheet 1
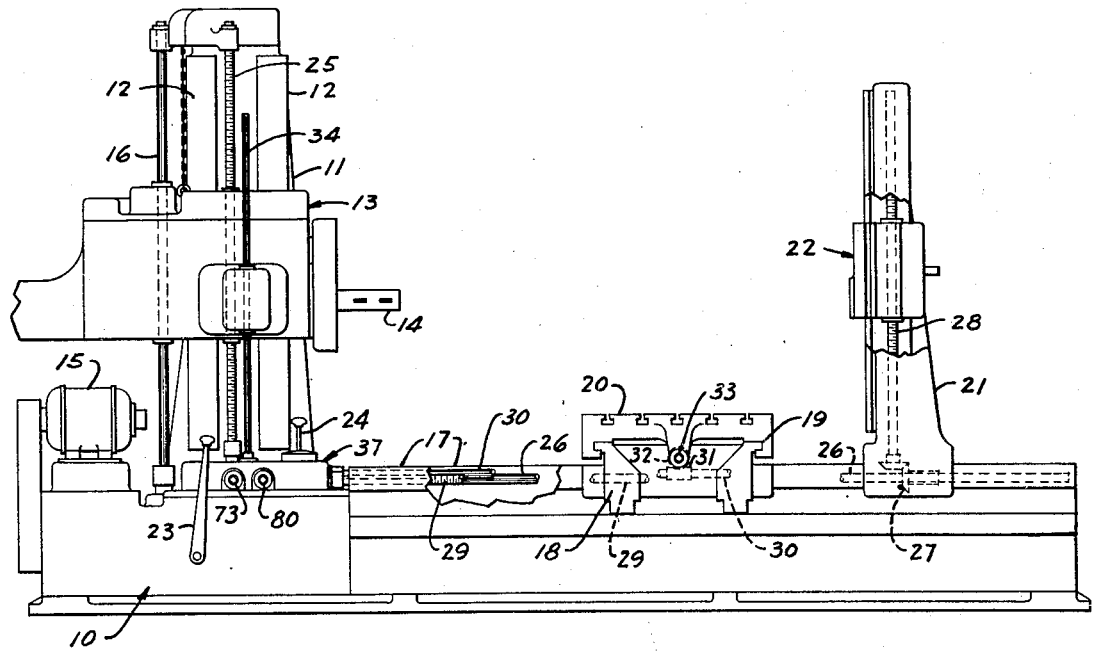
Fig. I
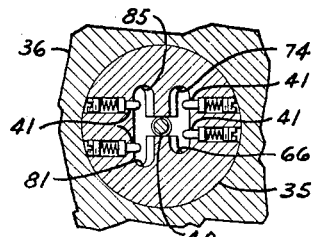
Fig. III
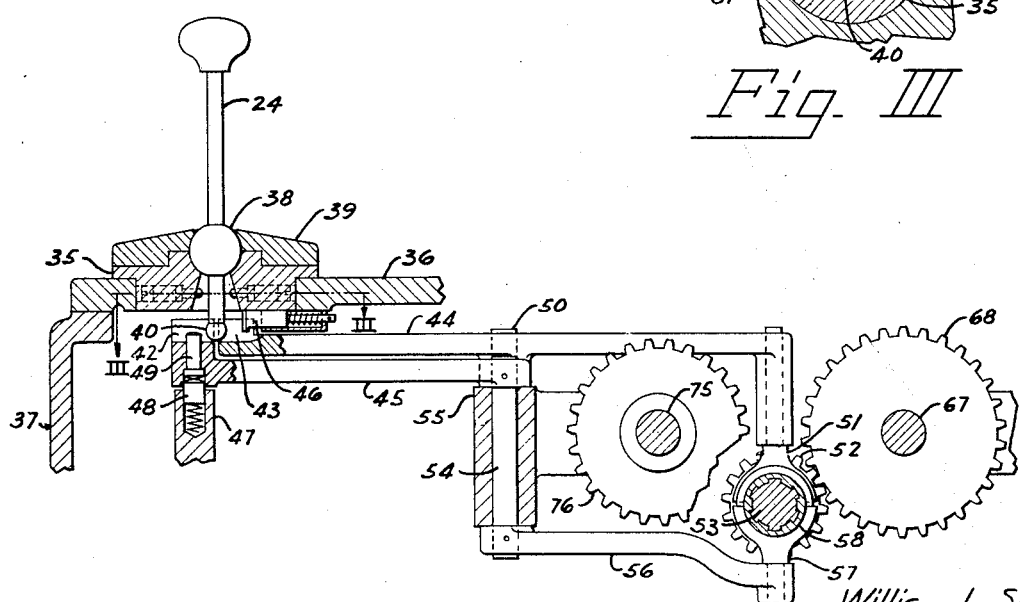
Fig. II
Willis J. Snyder
INVENTOR
BY Marshall & Marshall
ATTORNEYS April 6, 1943.  W. J. SNYDER  2,315,877
MACHINE TOOL
Filed June 9, 1941  2 Sheets-Sheet 2
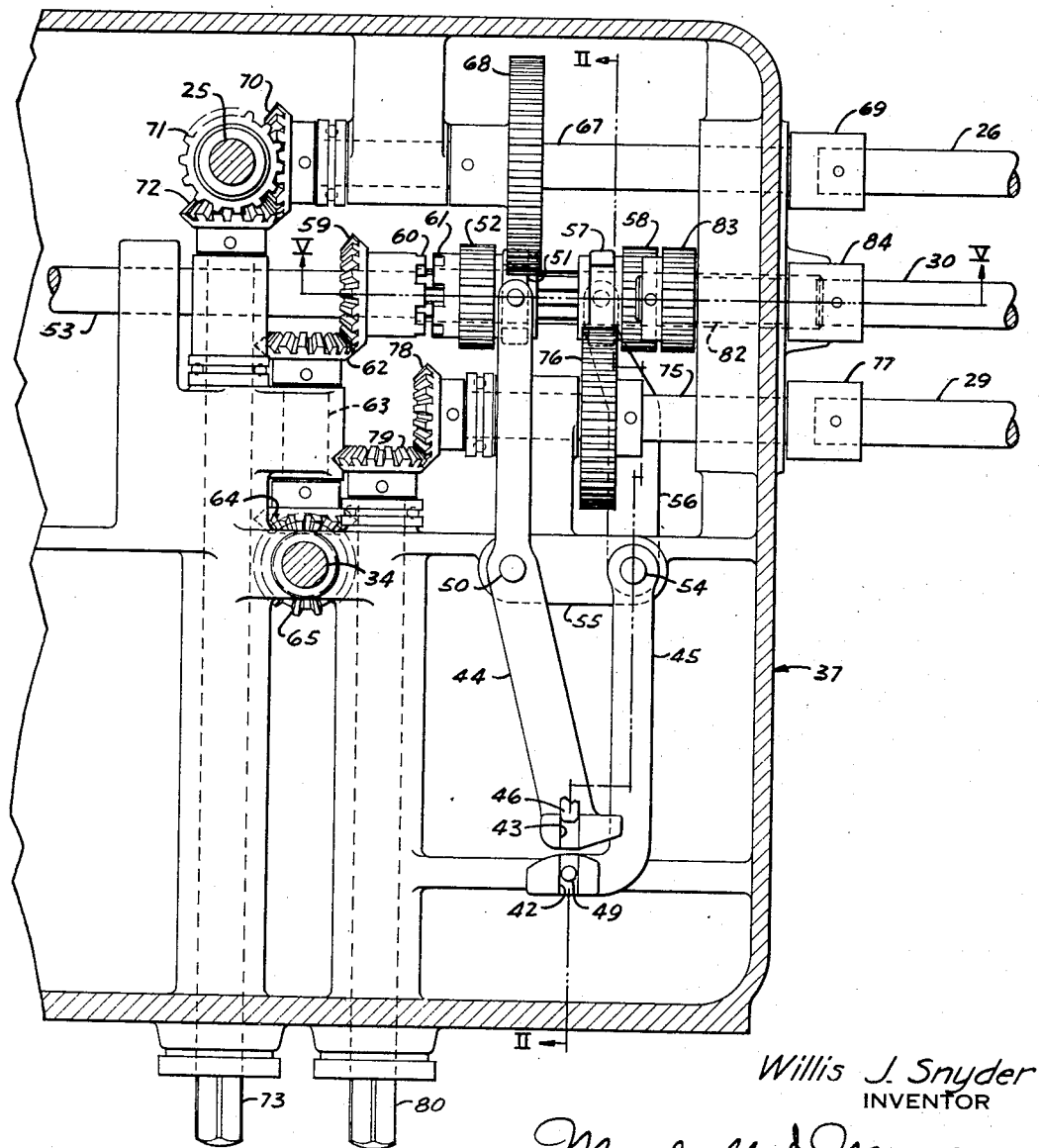

Patented Apr. 6, 1943

2,315,877

UNITED STATES PATENT OFFICE 2,315,877

MACHINE TOOL

Willis Jay Snyder, Defiance, Ohio, assignor to Defiance Machine Works, Inc., Defiance, Ohio, a corporation of Ohio Application June 9, 1941, Serial No. 397,227

5 Claims. (Cl. 77—3)

This invention relates to machine tools of the type which has a plurality of relative movements of the work holder and toolholder, and more particularly to means for applying power to cause such relative movements.

In setting a machine tool, it is necessary to adjust the position of the work both vertically and horizontally, to line up the work with the tool by which the operation is to be performed. It may also be necessary to position the toolholder with respect to the work. In precision metal working machines in particular, the tool must be located relative to the work within very exacting tolerances. Since it is often necessary to move the work first vertically and then horizontally, or vice versa, to line up the tool and the work, it is necessary that each of these adjustments be made independently of the others, and that each adjustment, after having been made, be not disturbed when another adjustment is made in a different direction.

Different driving mechanisms are generally used to produce different relative movements of the tool and the work. A single source of power is usually employed for three or four of such driving mechanisms.

Each of the driving mechanisms can be individually energized, the movement resulting therefrom carefully controlled, and the mechanism left in the correct position where it is not affected by subsequent movements of the other driving mechanisms; but the operator may inadvertently have more than one of the driving mechanisms connected at the same time and thus produce a compound movement which is impossible to control accurately.

The principal object of this invention is to provide a controlling device having a single shifting member to apply power from a single source alternatively to three or more driving mechanisms without danger of disturbing those already set.

More specific objects and advantages are apparent from the description, in which reference is had to the accompanying drawings illustrating a preferred embodiment of the invention.

In the drawings:

Fig. I is a front elevation of a machine tool embodying the invention, which in the form illustrated is a horizontal boring mill.

Fig. II is a fragmentary vertical section on a greatly enlarged scale, taken on the line II—II of Fig. IV.

Fig. III is a fragmentary horizontal section taken on the line III—III of Fig. II.

Fig. IV is a fragmentary horizontal section of the selecting mechanism.

Fig. V is a fragmentary vertical section taken on the line V—V of Fig. IV.

These specific drawings and the specific description that follows merely disclose and illustrate the invention and are not intended to impose limitations upon the claims.

Mounted on a main frame 10 is a vertical column 11, in which are channeled vertically disposed ways 12. Slidably mounted on the ways 12 is a machine head 13 which comprises a housing containing gearing adapted to rotate a toolholding spindle 14 and further gearing for advancing or feeding the spindle 14. Mounted on the main base 10 is a source of power, in this case an electric motor 15, which drives the machine through speed change gearing (not shown), the output shaft of which actuates the various moving portions of the machine. A vertically disposed splined shaft 16 is driven by the output shaft of the speed change gearing and imparts power to the gearing contained in the head 13 for causing the rotation of the toolholding spindle 14.

Slidably mounted upon horizontal ways 17, located on the upper surface of the main frame 10, is a saddle 18 which has transverse ways 19 on its upper surface and supports thereon a workholding platen 20 which is adapted to be moved transversely across the saddle. Adjustably mounted on the ways 17, at the end of the bed farthest from the main column 11, is a tail block supporting tower 21. Vertically adjustable in the tower 21, on ways machined therein, is a tail block 22, adapted to support the end of a long tool which may be rotated and fed by the spindle 14.

A main clutch lever 23 serves to disengage the output shaft of the speed change gearing from the input shaft of the selecting mechanism, which is located within the main frame 10. A selecting lever 24 projects from the main frame 10 and is adapted to shift the power input of the selecting mechanism to any one of the several driving mechanisms.

One of the driving mechanisms comprises gearing leading to a head elevating screw 25, vertically journaled in the main column 11, and a splined shaft 26 extending longitudinally through the base 10 and driving a beveled gear 27 and through it a tail block elevating screw 28, located in the tail block tower 21. The tail block elevating screw 28 is moved in unison with the head elevating screw 25 to assure perfect alinement of the spindle 14 and the tail block 22. Another of the driving mechanisms comprises gearing leading to a saddle screw 29, which is longitudinally disposed with relation to the main frame 10, and which by its rotation causes the saddle 18 to move longitudinally on the main frame 10. Another of the driving mechanisms comprises gearing leading to a splined platen shaft 30 which extends longitudinally through the base 10 and through a worm 31 journaled in the saddle 18 and in mesh with a worm gear 32, keyed on a platen screw 33, which is threaded through portions of the platen so as to produce transverse movement of the platen. Another of the driving mechanisms comprises gearing leading to a vertical splined spindle feed shaft 34 which extends upwardly from the main frame 10 and into the spindle housing 13, where it drives gears adapted to feed the main spindle 14 toward and from the work.

Thus the relative movements of the work holder and the toolholder are longitudinal movement of the saddle, transverse movement of the platen, vertical movement of the spindle and feeding of the spindle. Mechanism which selectively applies the power to the several driving mechanisms is illustrated in Figs. II, III, IV and V.

The selecting lever 24 is mounted in a hemispherical socket in a slotted plate 35, which is in turn mounted in a cover plate 36 located over a selecting mechanism housing 37 which is a portion of the main frame 10. The selecting lever 24 consists of a knob, a shaft and an integral ball-shaped portion 38, which is located in the hemispherical socket in the plate 35 and held therein by a retaining plate 39. The mounting of the selecting lever 24 permits limited angular movement of the lever in any direction. The lower extremity of the lever 24 is turned into a smaller ball-shaped portion 40. The section of the lever 24 below the ball 38 is movable within an H-shaped slot in the plate 35 (Fig. III). Mounted in the plate 35, all on the same horizontal level and near the ends of their respective legs of the H-shaped slot, are spring-pressed detents 41. These detents are for the purpose of holding the selecting lever 24 in whichever of the four operating positions it is placed. The ball 40, integral with the lower end of the selecting lever 24, can be engaged in slots 42 and 43 formed in the upturned ends of main shifting levers 44 and 45. The center line of the two slots 42 and 43 is in the same vertical plane as the center line of the cross arm of the H-shaped slot in the plate 35. Mounted horizontally beneath the cover plate 36, and extending into the slot 43 of the shifting lever 44 when the lever 44 is in the neutral position shown, is a spring-extended plunger 46 which, until displaced by the ball 40 of the selecting lever 24, prevents any movement of the lever 44.

Mounted in a boss 47 of the housing 37 is a spring-extended finger 48 which, when the main shifting lever 45 is in the neutral position shown, extends upward into a vertical hole in the main shifting lever 45, which hole is located beneath and intersects the slot 42. Mounted in this hole in the main lever 45 is a pin 49 which rests on the finger 48 and which, when displaced by the ball 40, moves the finger 48 downward, thus releasing the lever 45 for angular movement.

The shifting lever 44 is pivoted on a stud 50 and carries at its innermost end a vertically disposed rotatable fork 51, which extends downward into an annular groove in the hub of a slidable gear 52 splined on a main power shaft 53. The main shifting lever 45 is pinned on the upper end of a vertically disposed shaft 54 which is journaled in a boss 55 of the housing 37 and has keyed to its lower end an extension lever 56. Pivoted in the opposite end of the extension lever 56 is a vertically disposed fork 57 which extends upward into an annular groove in the hub of a second shiftable gear 58 also splined on the main power shaft 53. The main power shaft 53 is rotatably mounted in spiders in the housing 37 and is driven from the output of the speed change mechanism through the clutch controlled by the lever 23 (Fig. I).

Rotatably mounted on the main shaft 53 is a bevel gear 59 having clutch teeth 60 adapted to be engaged by clutch teeth 61 on the shiftable gear 52. The bevel gear 59 meshes with a bevel gear 62 pinned on one end of a shaft 63 rotatably mounted in a spider of the housing 37 and having pinned on its other end a bevel gear 64. Meshing with the bevel gear 64 is another bevel gear 65, pinned on the lower end of the vertically disposed spindle feed shaft 34. Thus when the lower end of the selecting lever 24 is moved into the position 66 (Fig. III), where it is adapted to be held by the detent 41, the lever 44 is swung in a counterclockwise direction (Fig. IV) and the clutch teeth 60 and 61 are engaged to apply power from the main shaft 53 to the vertically disposed spindle feed shaft 34.

Mounted in a spider of the housing 37, on a horizontal plane above that of the main power shaft 53 (Figs. II and IV), is a head and tail block shaft 67. Pinned on the shaft 67 is a gear 68, which is adapted to be engaged by the shiftable gear 52. At the end of the shaft, which extends outside the housing 37, is a socket 69 in which the splined tail block extension shaft 26 is held with a shear pin. Pinned on the opposite end of the shaft 67 from the socket 69 is a bevel gear 70 which meshes with bevel gears 71 and 72. The two bevel gears 71 and 72 are of slightly smaller diameter than the gear 70 so that, although they both mesh with the gear 70, they do not mesh together. The bevel gear 71 is pinned on the lower end of the vertically disposed head elevating screw 25. The bevel gear 72 is pinned on the inner end of a shaft 73, the other end of which extends out of the housing 37 and is squared to receive a hand crank for manually raising or lowering the head and tail block. Thus when the lower end of the selecting lever 24 is moved into position 74 (Fig. III) the main shifting lever 44 is swung in a clockwise direction, meshing the gears 52 and 68 and applying power from the main power shaft 53 to raise or lower the head and tail block by means of the screw 25 and the splined extension shaft 26 and its connections.

Mounted similarly to the shaft 67 is a shaft 75 which has pinned thereon a gear 76 adapted to be engaged by the shiftable gear 58. Located on the outermost end of the shaft 75 is a socket 77 in which is shear-pinned the end of the saddle screw 29. Pinned on the opposite end of the shaft 75 is a bevel gear 78 which meshes with a bevel gear 79 pinned on the innermost end of a shaft 80 extending outside the housing 37 and having a squared end adapted to receive a crank for manually adjusting the longitudinal position of the saddle on the main frame 10. When the lower end of the selecting lever 24 is moved into the position 81, the main shifting lever 45 and the extension lever 56 are swung in a counterclockwise direction, meshing the shiftable gear 58 with the gear 76 and applying power from the main power shaft 53 to the saddle screw 29 to move the work longitudinally on the main frame 10.

Journaled in a boss in the housing 37 on the same vertical plane with and immediately above the main power shaft 53, is a shaft 82 having a gear 83 pinned to its inner end which is adapted to be engaged by the shiftable gear 58. The outer end of the shaft 82 carries a socket 84 in which is shear-pinned the platen shaft 30. Thus, when the lower end of the selecting lever 24 is moved into the position 85 (Fig. III), the main shifting lever 45 and the extension lever 56 are moved in a clockwise direction, engaging the gears 58 and 83, and power from the main power shaft 53 is applied to move the platen transversely on the saddle through the shaft 30, the worm 31, the worm gear 32 and the platen screw 33.

Thus the operator can apply power from a single power source in any order to each of three or more driving mechanisms without having to move the power driven members through the position to engage any one of the driving mechanisms while shifting between two others.

The embodiment of the invention that has been disclosed may be modified to meet various requirements.

Having described my invention, I claim:

1. A machine tool comprising a work holder, a tool holder, a source of power, a transmission including a manually operable shifting member having at least three operating positions, and neutral positions through which it is movable while moving from any of its operating positions to another, a separate driving mechanism corresponding to each operating position of the shifting member, which is brought, by movement of the shifting member to that position, into driven relation with said source of power, but is idle while the shifting member is in a neutral position, and a separate member driven by each of said driving mechanisms, said driven members being each adapted to produce a different relative movement of said work holder and said tool holder.

2. A machine tool comprising a work holder, a tool holder, a source of power, a transmission including a manually operable shifting member having neutral positions and at least three operating positions, a guide for causing said member to pass through neutral positions while moving from any of its operating positions to another, a separate driving mechanism corresponding to each operating position of the shifting member, which is brought, by movement of the shifting member to that position, into driven relation with said source of power, but is idle while the shifting member is in a neutral position, and a separate member driven by each of said driving mechanisms, said driven members being each adapted to produce a different relative movement of said work holder and said tool holder.

3. A machine tool comprising a work holder, a tool holder, a source of power, a transmission including a manually operable shifting member having neutral positions and at least three operating positions, a detent for holding said member in each of its operating positions, a guide for causing said member to pass through neutral positions while moving from any of its operating positions to another, a separate driving mechanism corresponding to each operating position of the shifting member, which is brought, by movement of the shifting member to that position, into driven relation with said source of power, but is idle while the shifting member is in a neutral position, and a separate member driven by each of said driving mechanisms, said driven members being each adapted to produce a different relative movement of said work holder and said tool holder.

4. In a machine tool, in combination, a work holder, a toolholder, said work holder and said toolholder being movable relative to each other in at least three non-parallel directions, a source of power, a transmission including a shiftable member having at least three operating positions and neutral positions through which it is movable when moving from any of its operating positions to another, a separate driving mechanism corresponding to each operating position of said shiftable member, each of said mechanisms being adapted to produce relative movement of said work holder and said toolholder in a different direction, and means operable by said shiftable member when moved into an operating position for drivingly engaging said source of power with that one of said driving mechanisms corresponding to the operating position into which said shiftable member is moved.

5. In a machine tool, in combination, a work holder, a toolholder, said work holder and said toolholder being movable relative to each other in at least three nonparallel directions, a source of power, a transmission including a shiftable member having at least three operating positions and neutral positions through which it is movable when moving from any of its operating positions to another, a guide member for causing said shiftable member to move through a neutral position while moving from any of its operating positions to another, a separate driving mechanism corresponding to each operating position of said shiftable member, each of said mechanisms being adapted to produce relative movement of said work holder and said toolholder in a different direction, and means operable by said shiftable member when moved into an operating position for drivingly engaging said source of power with that one of said driving mechanisms corresponding to the operating position into which said shiftable member is moved.

WILLIS JAY SNYDER.